United States Patent [19]
Nomura

[11] Patent Number: 5,097,280
[45] Date of Patent: Mar. 17, 1992

[54] MOUNTING APPARATUS OF LENS ACCESSORY

[75] Inventor: Hiroshi Nomura, Tokyo, Japan

[73] Assignee: Asahi Kogaku Kogyo Kabushiki Kaisha, Tokyo, Japan

[21] Appl. No.: 504,401

[22] Filed: Apr. 3, 1990

[30] Foreign Application Priority Data

Apr. 7, 1989 [JP] Japan ................. 1-41463[U]

[51] Int. Cl.⁵ .................................................. G03B 17/00
[52] U.S. Cl. .................................... 354/286; 354/295; 359/819
[58] Field of Search .................. 354/295, 195.12, 286, 354/400, 79, 195.1; 350/252

[56] References Cited

U.S. PATENT DOCUMENTS

| | | | |
|---|---|---|---|
| 2,953,970 | 9/1960 | Maynard | 350/257 |
| 3,896,463 | 7/1975 | Laskey | 354/122 |
| 4,676,605 | 6/1987 | Toda et al. | 350/252 |
| 4,942,414 | 7/1990 | Takahashi et al. | 354/195.12 |

FOREIGN PATENT DOCUMENTS

| | | |
|---|---|---|
| 1068549 | 11/1959 | Fed. Rep. of Germany . |
| 50-146542 | 12/1975 | Japan . |
| 58-98624 | 7/1983 | Japan . |
| 2140580 | 11/1984 | United Kingdom . |

*Primary Examiner*—W. B. Perkey
*Assistant Examiner*—Cassandra C. Spyrou
*Attorney, Agent, or Firm*—Sandler, Greenblum & Bernstein

[57] ABSTRACT

An accessory mounting apparatus is provided for mounting an accessory to an accessory mounting portion formed on the front end of a lens barrel. The mounting apparatus includes multiple threads formed on the accessory and the accessory mounting portion, adapted to engage each other, and magnetic members formed on the accessory and the accessory mounting portion which are magnetically attracted to each other.

19 Claims, 1 Drawing Sheet

MOUNTING APPARATUS OF LENS ACCESSORY

BACKGROUND OF THE INVENTION

1. Field of the Invention

The present invention relates to an apparatus for mounting an accessory to a camera lens.

2. Description of the Related Art

Generally speaking, a camera accessory, such as filter, close-up lens, hood, etc. is mounted to a camera lens by screwing the same into an accessory mounting screw portion (female thread) provided on the front end of a lens barrel of the camera lens. However, the accessory mounting screw portion is made of a single thread, and accordingly, the accessory engages with the accessory mounting screw (female thread) at only one circumferential portion on the periphery thereof. Therefore, it takes a relatively long time for an operator to meet the male thread of the accessory with the female thread of the accessory mounting screw portion. Furthermore, after the female thread meets with the male thread, it is necessary for an operator to rotate the accessory by several turns in order to completely engage the accessory in the accessory mounting screw portion. Therefore, the accessory mounting operation is a time consuming and troublesome operation. Because of this, an operator (photographer) may miss a shutter chance.

Accessory mounting devices using a permanent magnet or multiple thread which are free from the above-mentioned problem are also known.

However, in these conventional accessory mounting devices, in particular, a heavy accessory, such as a close-up lens having a plurality of lenses or a large hood tends to fall from the camera lens. In the case of a permanent magnet type mounting device, the heavy accessory can easily disengage from the camera lens when an external shock is applied thereto. On the other hand, in the case of a multiple thread type mounting device, because of the large lead of the multiple thread, when the camera is carried with the bottom facing up, the accessory can rotate and fall easily by the dead weight thereof.

An accessory mounting device using a type mounting bayonet is also known. However, in this accessory mounting device, it is necessary to register a mark of the bayonet with a reference mark of the camera lens.

Generally speaking, the above mentioned accessory mounting systems have a drawback, that is, an easy detachment of the accessory from the camera lens.

SUMMARY OF THE INVENTION

The primary object of the present invention is to provide an accessory mounting apparatus with an accessory that can be easily mounted to a camera lens and which prevents the accessory from being accidentally detached from the camera lens by a shock or the dead weight thereof.

To achieve the object mentioned above, an accessory mounting apparatus according to the present invention includes a magnetic attraction mechanism and a multiple thread mounting mechanism in combination to eliminate the above-noted drawbacks which would be caused if the magnetic attraction mechanism and the multiple thread mounting mechanism are separately used. The connection by the magnetic attraction mechanism prevents the accessory from accidentally falling from the camera lens by rotation from the dead weight thereof, but can not prevent the accessory from being disengaged from the camera lens by an external shock applied thereto. On the other hand, the connection by the multiple thread mounting mechanism is strong enough to prevent the accessory from being disengaged due to an external shock but is not enough to prevent the disengagement of the accessory from the camera lens due to rotation from the dead weight of the accessory.

According to the present invention, there is provided an accessory mounting apparatus for mounting an accessory to an accessory mounting portion formed on a lens barrel, comprising multiple threads which are formed on the accessory and the accessory mounting portion to engage with each other, and magnetic members which are formed on the accessory and the accessory mounting portion to be mutually and magnetically attracted.

The simplest mutually attracted magnetic members are permanent magnets or a permanent magnet and a magnetic body.

The accessory mounting portion can be formed integral with the lens barrel or can be detachably screw-engaged in a female thread formed at the front end of the camera lens barrel.

BRIEF DESCRIPTION OF THE DRAWING

The invention will be described below in detail with reference to the accompanying drawing in which.

DESCRIPTION OF PREFERRED EMBODIMENT

Figure 1:
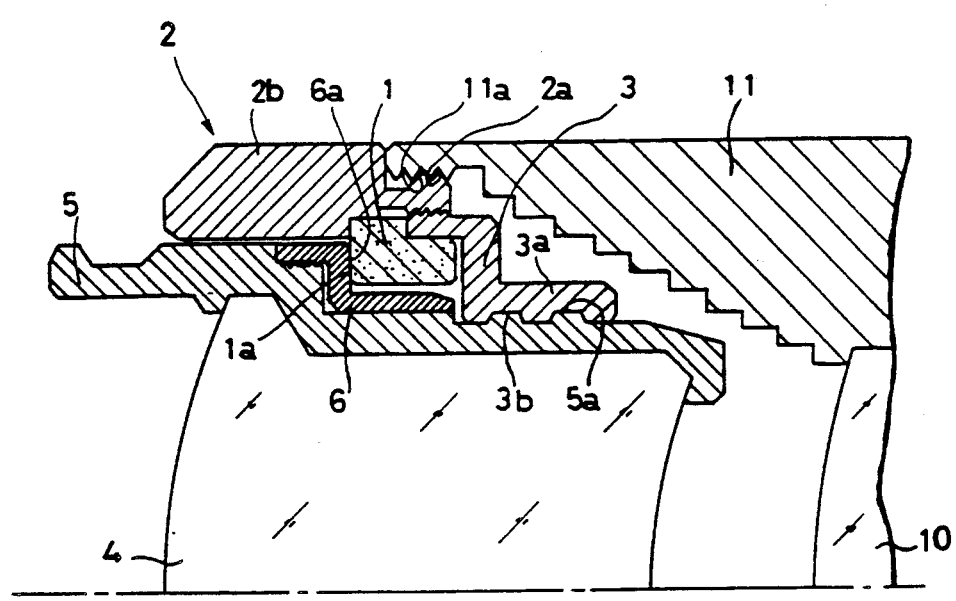
FIG. 1 is a longitudinal sectional view of an upper half of a lens accessory mounting apparatus according to the present invention.

FIG. 1 shows an embodiment of the present invention, in which a lens barrel 11 of a photographing lens 10 is provided, on an inner periphery of a front end thereof, with a single female thread 11a.

An accessory mount 2 which has an annular permanent magnet 1 is screwed in the single female thread 11a through a single male thread 2a of the accessory mount 2. The annular permanent magnet 1 is held between an accessory mount body 2b having the single male thread 2a and a keep ring 3 which is screw-engaged with the accessory mount body 2b. The annular permanent magnet 1 has an open attractive end surface 1a. The keep ring 3 has a reduced diameter portion 3a which has a smaller diameter than that of the permanent magnet 1 and which has a multiple female thread 3b. Thus, the accessory mount 2 has a female stepped sectional shape consisting of a larger diameter portion of the mount body 2b, an intermediate diameter portion of the permanent magnet 1 and a smaller diameter portion of the keep ring 3.

A close-up lens 4 as a lens accessory has a lens barrel 5 which is usually made of aluminium alloy and which has a male stepped sectional shape consisting of a larger diameter portion, an intermediate diameter portion and a smaller diameter portion, corresponding to the accessory mount 2. A magnetic member 6 is secured to the stepped portion of the accessory lens barrel 5 between the larger diameter portion and the intermediate diameter portion thereof. The magnetic member 6 has an attractive surface 6a which is opposed to the attractive end face 1a of the annular permanent magnet 1 to be magnetically attracted thereby. The accessory lens barrel 5 is provided, on the outer periphery of the smaller diameter portion thereof, with a male multiple thread 5a which is engaged by the associated female multiple thread 3b of the keep ring 3 when the attractive end surfaces 1a and 6a come into contact with each other.

In the accessory mounting apparatus as constructed above, the accessory mount 2 is screw-engaged in advance in the lens barrel 11 of the photographing lens 10 through the male thread 11a and the female thread 2a. In this state, the close-up lens 4 is inserted in the accessory mount 2 to oppose the male multiple thread 5a and the female multiple thread 3b. Thereafter, the close-up lens 4 (the accessory lens barrel 5) is rotated with respect to the accessory mount 2. Due to the multiple threads, only a slight angular displacement (rotation) of the close-up lens 4 causes the male multiple thread 5a to be engaged in the female multiple thread 3b. Furthermore, due to large leads of the multiple threads, a slight angular displacement of the close-up lens 4 causes the attractive end surface 1a of annular permanent magnet 1 to come into contact with the corresponding attractive end surface 6a of the magnetic member 6.

In this state, even if an external shock is applied, the engagement of the multiple threads 3b and 5a on the accessory mount side and the close-up lens side respectively, prevents the close-up lens 4 from being disengaged from the accessory mount 2 (and accordingly the lens barrel 11 of the photographing lens 10). On the other hand, even if the photographing lens is carried or held with the bottom up, the magnetic connection between the permanent magnet 1 and the magnetic member 6 effectively prevents the close-up lens 4 from accidentally falling from the accessory mount 2.

The lead angle and the number of threads of the multiple threads 3b and 5a are determined so that performance of the above mentioned operations and functions is effectively balanced, a good result was obtained by 10°~15° of lead angle and 10~20 threads (although FIG. 1 depicts only two threads for illustration). The effective engagement length of the multiple threads 3b and 5a is such that the angular displacement of the accessory (e.g. close-up lens) 4, necessary for mounting the accessory to the accessory mount and and, accordingly to the lens barrel of the photographing lens, is perferably 25°~50°.

The magnetic member 6 is needed since the lens barrel 5 is usually made of a non-magnetic material. Therefore, if the whole lens barrel 5 is made of a magnetic material, the magnetic member 6 can be dispensed with. Accordingly, the attractive surface 6a can be provided directly on the lens barrel 5 without the magnetic member 6.

As can be seen from the foregoing, according to the present invention, the respective drawbacks resulting from a singular application of the magnetic attraction connection and the multiple thread connection are mutually cancelled, so that a simple and reliable accessory mounting apparatus in which an accessory can be easily mounted realized and the possibility of the accessory falls from falling the associated camera lens can be prevented. Namely, so long as an operator (photographer) intentionally detaches the accessory from the camera lens, there is no possibility that the accessory will accidentally for or accidentally disengaged from the camera lens due to an external shock applied thereto or due to rotation caused by the dead weight of the accessory, thus resulting in no possibility of breakage of the accessory. Consequently, it is possible for a photographer to concentrate his or her attention upon the photographing. Furthermore, since the accessory can be easily and quickly attached to the camera lens, no photographer misses a shutter chance.

I claim:

1. An accessory mounting apparatus for mounting an accessory to an accessory mounting portion on a front end of a lens barrel, said mounting apparatus comprising multiple threads on the accessory and on the accessory mounting portion which are adapted to engage each other, and magnetic members on the accessory and on the accessory mounting portion which are adapted to be mutually and magnetically attracted to each other.

2. An accessory mounting apparatus according to claim 1, wherein said lens barrel has a front end which is provided with a female thread, wherein said accessory mounting portion comprises an accessory mount separate from the lens barrel, said accessory mounting portion further comprising a male thread which can be engaged in the female thread of the lens barrel.

3. An accessory mounting apparatus according to claim 2, wherein said magnetic member provided on the accessory mounting portion is a permanent magnet.

4. An accessory mounting apparatus according to claim 3, wherein said magnetic member provided on the accessory comprises a magnetic body.

5. An accessory mounting apparatus according to claim 3, wherein said permanent magnet provided on the accessory mounting portion has an annular body having an open magnetically attractive surface.

6. An accessory mounting apparatus according to claim 5, further comprising a keep ring which holds the permanent magnet provided on the accessory mount.

7. An accessory mounting apparatus according to claim 6, wherein said keep ring comprises a small diameter portion of said accessory mounting portion, said accessory mounting portion also including an inner peripheral section with a multiple thread.

8. An accessory mounting apparatus according to claim 6, wherein said magnetic member has a magnetic attractive surface opposed to the magnetically attractive surface of the annular permanent magnet.

9. An accessory mounting apparatus according to claim 8, wherein said accessory comprises a small diameter portion which is formed at a rear end of said accessory, said small diameter portion of said accessory being provided on its outer periphery with a multiple thread which is adapted to be engaged with the multiple thread of the keep ring.

10. An accessory mounting apparatus according to claim 9, wherein said permanent magnet is held between the accessory mount and the keep ring.

11. An accessory mounting apparatus according to claim 1, wherein said multiple threads provided on the accessory and the accessory mounting portion comprise 10~20 threads.

12. An accessory mounting apparatus according to claim 1, wherein said multiple threads provided on the accessory and the accessory mounting portion have a lead angle of 10°~15°.

13. An accessory mounting apparatus according to claim 1, wherein said magnetic members on the accessory and on the accessory mounting portion are magnetically connected to each other when a relative angular displacement of 25°~50° of the accessory occurs after the multiple threads on said accessory and on said accessory mounting portion become engaged.

14. A combination of an accessory mount provided on a front end of a lens barrel and an accessory which is detachably attached to the accessory mount, said combination further comprising magnetic members on the accessory mount and on the accessory which are mutually magnetically attracted, and multiple threads on the accessory mount and on the accessory which are to be mutually engaged.

15. A combination of an accessory mount and an accessory according to claim 14, wherein said magnetic members are mutually attracted when the multiple threads provided on the accessory mount and the accessory are engaged with each other.

16. An accessory mounting apparatus for mounting an accessory to an accessory mount provided on a front end of a lens barrel, wherein said accessory mount has a stepped female sectional shape having a large diameter portion, an intermediate diameter portion and a small diameter portion, as viewed rearwardly from the front of said accessory mount, said accessory having a corresponding stepped male sectional shape having a large diameter portion, an intermediate diameter portion, and a small diameter portion, wherein the accessory mounting apparatus further comprises magnetic members provided between the intermediate diameter portions of the accessory mount and the accessory, and multiple threads provided on the small diameter portions of the accessory mount and the accessory.

17. An accessory mounting apparatus in accordance with claim 16, wherein said accessory mount large diameter portion comprises an accessory mounting body, said accessory mount intermediate diameter portion comprises an annular permanent magnet, and said accessory mount small diameter portion comprises a keeper ring.

18. An accessory mounting apparatus in accordance with claim 17, wherein said accessory mounting body has an interior thread which is threadably connected to said keeper ring, and an exterior thread which is threadably connected to said lens barrel.

19. An accessory mounting apparatus in accordance with claim 17, wherein said accessory intermediate diameter portion comprises one of said magnetic members, said one magnetic member being threadably connected to said large diameter portion of said accessory.

* * * * *